No. 701,457. Patented June 3, 1902.
J. ARMSTRONG.
APPARATUS FOR OBTAINING ZINC OR OTHER VOLATILE METALS FROM ORES OR MATTES.
(Application filed Aug. 30, 1900.)
(No Model.)
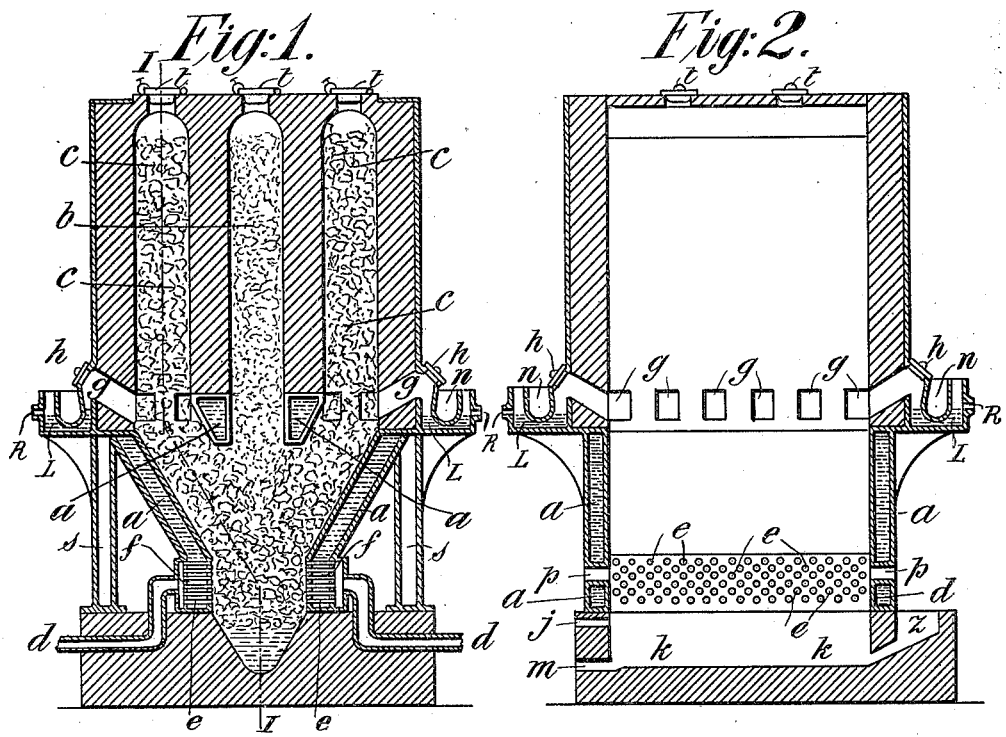
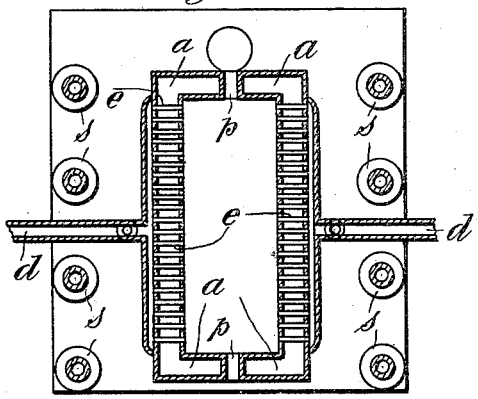
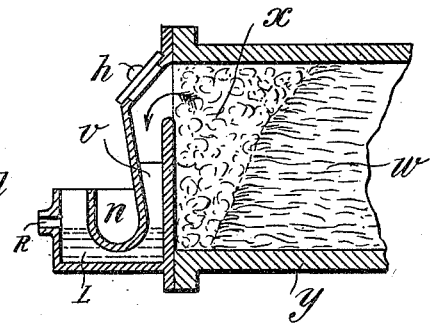
Witnesses
Edwin D. Bartlett
Roland James Grant
Inventor
John Armstrong
per Herbert Sefton Jones
Attorney

UNITED STATES PATENT OFFICE.

JOHN ARMSTRONG, OF LONDON, ENGLAND.

APPARATUS FOR OBTAINING ZINC OR OTHER VOLATILE METALS FROM ORES OR MATTES.

SPECIFICATION forming part of Letters Patent No. 701,457, dated June 3, 1902.

Application filed August 30, 1900. Serial No. 28,569. (No model.)

*To all whom it may concern:*

Be it known that I, JOHN ARMSTRONG, a subject of the Queen of Great Britain, residing at 46 Lombard street, in the city and county of London, England, have invented a new and useful Improved Apparatus for Obtaining Zinc or other Volatile Metals from Ores or Mattes, of which the following is a specification.

This invention relates to zinc and other volatile metals, and has for its object the provision of means whereby metal may be obtained from ores or mattes or oxids or mixtures with other ores or materials and with more expedition and with less loss and labor and greater economy than by the ordinary processes.

I will now describe the process and apparatus in their application to zinc.

Hitherto zinc ore or residues from other processes containing zinc if in the form of calamin or carbonate or of blend or sulfid have first to be roasted to get rid of the carbonic acid or sulfur they may contain with the object of reducing the zinc to a state of oxid. When this is accomplished, the roast is mixed with about fifty per cent. of carbon and placed in a retort and distilled, the gaseous metallic zinc being condensed in condensers attached to the retorts; but this method of reducing zinc to the metallic state is unavoidably accompanied by serious loss in metal, mainly due to the difficulty of condensing the vapors and the oxidation of the vapors in the condensers or attachments and the wear and tear and breakage of retorts.

This invention is designed to obviate these losses, at the same time to distil the zinc and condense the vapors more rapidly and economically than hitherto, and I accomplish this mainly by using carbon-monoxid gas and using a special form of furnace and condenser (which latter will be described further on) which condenses rapidly all the metallic vapors and filters the vapors by passing through a liquid bath of zinc. Where the bath is exposed, I cover the surface of the metal with some non-oxidizing or neutral substance with a melting-point below that of zinc. Such a substance as zinc chorid alone or mixed with caustic alkali and tartrate of potash I have found to answer very well.

Any suitable means may be employed for passing the vapors through the bath, such as sucking them up by means of a pump or exhaust and then pressing them through the bath or by using the pressure of the expansive power of the vapors themselves in forcing their way through the bath. The vapors may be made to be squirted by means of a series of tubes inserted into and under the metal in the bath, so that the vapors are broken up into various channels.

A furnace suitable for carrying my invention into effect is illustrated in the accompanying drawings, in which—

Figure 1 shows a vertical section. Fig. 2 shows a longitudinal section on the line I I of Fig. 1. Fig. 3 shows a plan through the twyers; and Fig. 4 shows the metal-bath and inlet thereto, on an enlarged scale, also in section and of somewhat-different design, it being shown as applied to an ordinary retort. In other respects it is similar to the condenser forming a part of my furnace.

Referring now particularly to Fig. 4 of the accompanying drawings, $y$ is a retort or muffle.

$w$ indicates the charge of ore; $x$, the carbon or coke through which the gases pass and flow in the direction of the arrow through the vertical tubes $v$ through the metallic bath L. An inspection-cover $h$ fits tight to its place and is hermetically sealed.

R is the tap-hole, which is plugged up until the zinc rises in the bath to the requisite height. It is then tapped off by withdrawing the plug, when the bath will resume its normal level, which keeps a seal on the siphon-trap $n$. In order to regulate the temperature of the trap, the space above the trap $n$ is filled with either a heating or with a cooling medium. The condenser being, however, of metal and well exposed, I have found in my experimental apparatus that the space above the trap $n$ requires but little water to keep it sufficiently cool and none at all on first starting.

The zinc-bath is used expressly for the purpose of condensing the metallic vapors to the liquid metallic state, and the object of the various channels, as already described, leading down into the bath is for the purpose of bringing the metallic vapors mixed with other gases into intimate contact with molten metallic zinc, which rapidly condenses the zinc-vapor in the same manner in which water condenses steam when that is introduced into it by similar means. Means have been devised whereby the non-condensible gases either escape from the open orifice of the bath or are collected for further use.

In conducting these operations in a blast-furnace or reverberatory or other furnace I proceed as follows: Any blast or other furnace may be employed with the necessary modifications to meet the circumstances to be described; but I prefer to carry out my operations in a furnace similar to the one here described and shown in the accompanying drawings. The furnace is of the water-jacket type of blast-furnace, the water-jacket being shown at $a\ a\ a$. The upper part of the furnace is divided into three compartments ordinarily closed at the top with feeding devices or caps $t\ t\ t$. The central compartment $b\ b$ is filled with the charge, consisting of one hundred parts of calcined ore and about fifty parts of carbon (if the ordinary charge of a zinc-retort is being used) and mixed in the usual manner. The compartments $c\ c$ on either side are filled with fuel, preferably with coke or anthracite. This furnace is square or oblong on plan; but it could be round or other shape and a series of chambers $c$ made to surround chambers $b$. The blast is supplied by means of the pipes $d\ d$ to numerous twyers $e\ e\ e$, which pass through the water-jacket at $f\ f$ and by doing so supply a gentle pressure of blast over a very large surface and through a large quantity of twyers or tubes. By the fuel occupying the two outside compartments and by its weight as it is burned away it sinks and is thereby always coming in a fresh volume before the mouth of the opening $g\ g$ and also in front of the twyers, where the blast meets it in small streams, converting it into carbonic dioxid immediately. This is driven through a further quantity of fuel and converted into carbon monoxid. It then comes toward the center of the furnace and into intimate contact with the descending column $b\ b$ of the charge, exercising upon it a reducing action and converting it into metallic vapor, which passes upward and onward and through the descending columns of fuel in the compartments $c\ c$, which are in a state of incandescence, whereby any carbonic acid or oxid is immediately taken up, while the vapors pass through the orifice $g\ g$ into the condenser and through the metallic (liquid) bath, as has just been described with regard to retorts. A description of the bath, the tap-hole, the exit of the gases or their collection, and other parts of the condensing apparatus need not be repeated, as they are precisely similar to what has already been described.

Other metals or metallic ores or mattes which are invariably present in zinc ores and which are also sometimes mixed with the charge as fluxes or desulfurizing agents—such metals as copper, lead, iron, tin, silver, gold, and the like, which are not sensibly volatile in a reducing atmosphere with fluxes—are reduced in the above furnace and collected either in the metallic form or as mattes in the sump at the lower part of the furnace, (marked $k\ k$.) Tapping-holes are provided for metals at $m$, $z$ being a well outside for taking off lead, $j$ being a tap-hole for slag or matte.

When it is required not to mix the flux with the charge before it is placed in the furnace, the fluxes may be rammed into the furnace through the orifices $p\ p$ right in front of the twyers.

The upper part of the furnace is supported upon the columns, (marked $s\ s$.)

What I claim is—

1. In a furnace for reducing volatile metals, the combination of a central column for the charge of mixed ore and fuel, side columns for the fuel, a reduction-chamber below into which they all converge, a large number of twyers or blast-orifices around the reduction-chamber whereby the blast is broken into minute streams, and therefore quickly deoxidized, a condensing device and exit-passages for the effluent gases direct to the condenser close adjoining, whereby the blast attacks evenly a layer of fuel below the part intermediate between the charge and the condenser, and raises the fuel above to a high heat and the effluent gases pass through this incandescent fuel above the hottest heating zone on their way to the condensers and the carbonic dioxid is changed to carbon monoxid before it is cooled.

2. In a furnace for smelting ores containing zinc, the combination of a reducing-chamber, means for feeding the charge thereto, a vessel containing a bath of zinc, means for keeping the zinc therein in a comparatively cool and liquid state and a passage for the vapors from the reduction-chamber through a still hotter part of the furnace into and below the surface of the liquid metal.

3. In a furnace for reducing ores containing zinc, the combination of a central columnar chamber for the charge of mixed ore and carbon, side columnar chambers for the fuel, a central reduction-chamber below into which all converge, numerous twyers on the sides of the reduction-chamber, a central sump below having a tapping device, an exit for the fumes through the fuel placed below the side columnar chambers and a bath containing molten zinc into which the said exit dips, whereby the zinc-vapor is volatilized and condensed in the liquid zinc and the less volatilizable metals collect in the sump.

4. In a furnace for reducing ores containing zinc, and other metals, the combinations of a central reducing-chamber, means for supplying fuel at the sides, means for supplying ore at the center, numerous twyers for supplying air through the fuel at the side to the ore, means for drawing off and means for condensing the zinc-vapors, a sump below for the less easily volatilizable metals to collect in and means for introducing fluxes a little above the fluid metal in the sump, but below the main portion of the zone of reduction.

5. The combination of a reducing-chamber, a vessel containing a bath of zinc, of means for heating the fuel between the reducing-chamber and said bath to a high degree, means for passing the zinc-vapors from the reducing-chamber through such highly-heated fuel to the bath of zinc, an exit below the surface of the fuel direct into said bath below the normal surface of the metal, and means for keeping the bath of metal at a temperature a few degrees above its fusing-point.

6. In a furnace for smelting zinc ores, the combination of the chambers $c\,c\,b$ for the purposes described, the water-jackets $a$ surrounding the space below said chambers giving a converging direction to the three columns $c\,b\,c$, the twyers $e$ passing through the water-jackets and formed of a vast number of small tubes, and the sump $k$ at the lowest point for the purposes described.

In testimony whereof I have signed my name to this specification in the presence of two subscribing witnesses.

JOHN ARMSTRONG.

Witnesses:
HERBERT SEFTON-JONES,
GEORGE HUGHES.